Patented Apr. 3, 1928.

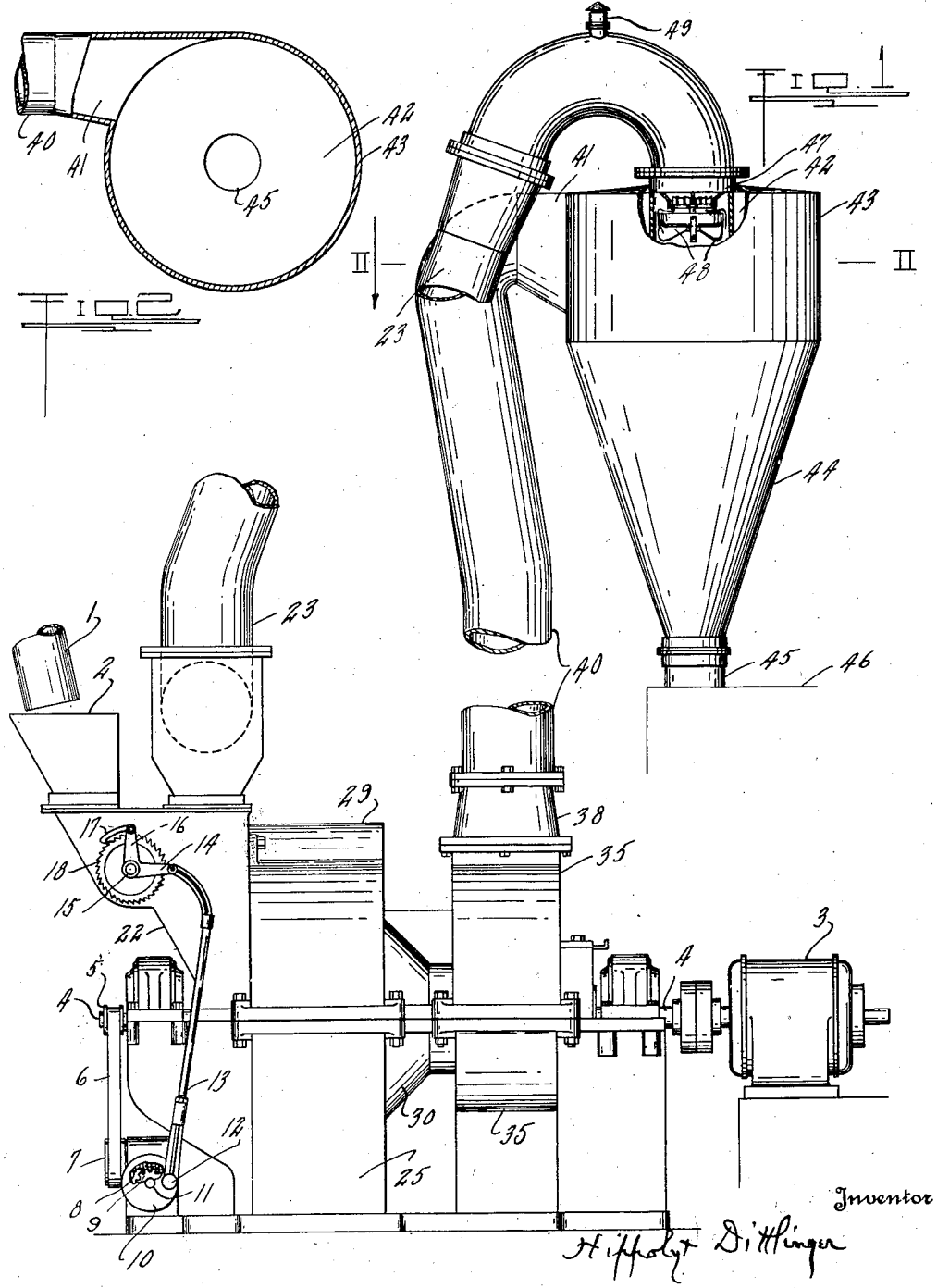

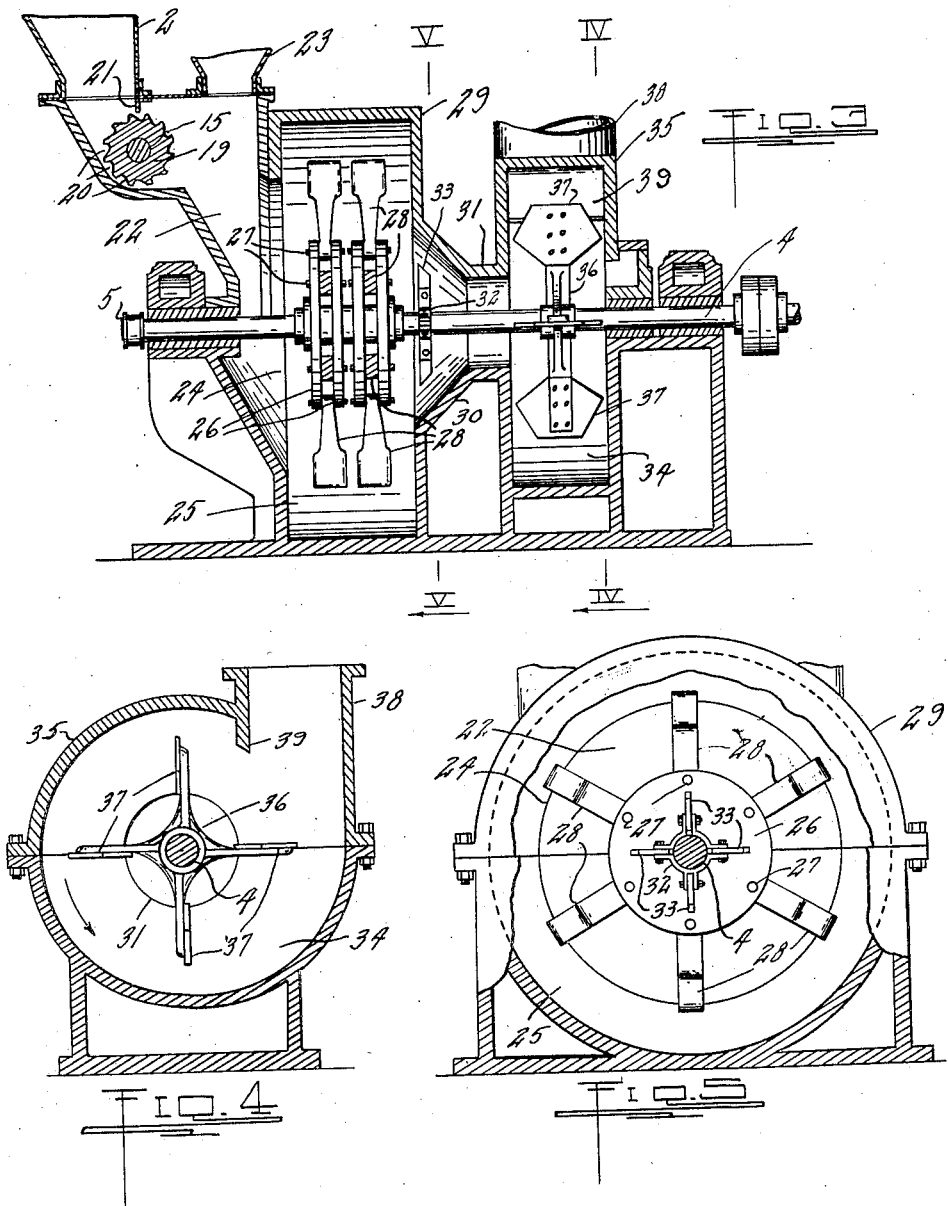

1,664,598

UNITED STATES PATENT OFFICE.

HIPPOLYT DITTLINGER, OF NEW BRAUNFELS, TEXAS.

PLASTIC HYDRATED LIME AND PROCESS OF MAKING IT.

Application filed June 25, 1926. Serial No. 118,518.

This invention relates to plasticity promotion of alkaline earth materials to render such effective for putty or finish coat purposes as in plastering.

This invention has utility when incorporated in mechanically sub-divided and dispersed hydrate, whether or not such be high calcium or dolomitic.

Referring to the drawings:

Fig. 1 is a side elevation, with parts broken away, of an embodiment of the invention for carrying out the operations hereunder;

Fig. 2 is a section on the line II—II, Fig. 1;

Fig. 3 is a vertical section through the impact pulverizer of Fig. 1;

Fig. 4 is a section on the line IV—IV, Fig. 3; and

Fig. 5 is a section on the line V—V, Fig. 3, in part.

Quick lime which has been hydrated in the usual way, is here taken, or in instances where it is desired to further supplement plasticity, special chemical treatment may have occurred. An instance of such special chemical treatment is the introduction into the hydration liquor for hydration, say of one-fourth of one per cent by weight of sodium hyposulphite. In this chemical treatment, it is desirable that the liquor effecting the hydration be so worked into the oxide or quick material, that there may not be excessive building up of temperature due to such exothermic reaction. This production of the hydrate may be either batch or continuous and results in an impalpable powder. The foreign materials which may be retained in the substance have a tendency to retain larger size, and such are readily removed by a scalper or reel type of screen. The fines as passing from this treatment may be delivered by chute 1 to hopper 2. Motor 3 is effective for driving shaft 4 which has remote from the motor 3 pulley 5 connected by belt 6 to pulley 7 driving worm 8 in mesh with worm wheel 9 for rotating at reduced speed disk 10 on shaft 11 having wrist pin 12 connected by adjustable link 13 to rock arm 14 loosely mounted on shaft 15. This rock arm 14 is an arm of an angle lever having second arm 16 carrying gravity dog 17 for engaging ratchet wheel 18. Fixedly mounted on shaft 15 with this ratchet wheel 18 is feed drum 19 having annular series of pockets 20. In the rotation of this feed drum, clockwise, the loose material in the hopper 2 falls downward to fill the pockets 20, and skimmer 21 acts as a cut off to limit the quantity of material fed by the feed drum to the quantity of material deposited in the series of pockets 20. By adjusting the link 13 the rate of feed of this drum, as to the rotation of the shaft 4, may be adjusted.

The material as delivered by the feed drum 19 falls into chute 22 with in-coming air from duct 23, and is drawn through opening 24 about the shaft 4 into a pulverizing chamber 25. The shaft 4 in this chamber 25 is provided with spider disks 26 having bolts 27 mounting arms or hammers 28 free to swing relatively to the disks 26 in the high speed rotation of the shaft 4. These hammers 28 have considerable clearance as to the housing 29 for the chamber 25. As these hammers 28 are pivoted, they are yieldable in their throw action and tend in their normal rotation to approximate a drag position more or less tangential and collide with the fine material entering this housing 25 by the opening 24 to throw this material to have such material collide with the inner wall of the housing 29, as a continuous shattering of the material thereagainst with resultant subdivision action on the material on itself, as well as causing temperature rise therein.

From this chamber 25, there is tapered throat 30 to axial outlet 31. In this throat 30 is disposed spider 32 having radiating arms 33 which may be axially adjusted into more or less close proximity to the walls of the tapered throat portion 30. These arms 33, rotating in synchronism with the shaft 4, tend to intercept the exit of particles which may not freely pass through this tapered portion 30. Accordingly, this serves as a control device of an air cleaner type insuring the holding back into the chamber 25 of aggregates of this impalpable powder until such aggregates are further ruptured.

The outlet 31 is an axial entrance to fan chamber 34 in volute housing 35. The shaft 4 in this chamber 34 carries spider 36 having fan blades 37 thereon with a degree of clearance from the inner wall of the housing 35. From this housing 35, there is tangential discharge ducts 38. On the after side of this duct 38, there is depending flange 39 as a restriction of the circuit in the fan chamber 34. This means that the material as thrown clear of the blades 37 in the housing 34 is impelled out the discharge duct 38 instead of being churned about in the chamber 34. This means there is a very material increase in the capacity of the device. This discharge duct 38 delivers to riser 40 of approximately constant diameter. This means that the delivery rate of material from the fan is at a maintained constant velocity therefrom against precipitation or settling out of the lifted material as taken from the pulverizer. This riser duct 40 has tangential discharge 41 into swirl chamber 42 of cyclone housing 43. This means a reduction in the velocity of the air travel with resultant settling out or precipitation of the material as ladening the air, which material is deposited along the collector cone 44 to be discharged by outlet 45 into bin 46 for sacking or bulk storage as may be desired.

Concentric with the housing 43, is air discharge duct 47. Just inward of the housing 43 from this discharge duct 47, is rotating vane air cleaner 48 as additional means for throwing out material as ladening the air. It is a further purification of the air for increased production volume with the air circuit in the installation herein a closed one. The duct 47 is provided with relief valve 49 which may maintain the pressure balance in the system. This air duct 47 extends to incoming air duct 23 at the feed end of the machine of this closed air circuit installation.

This is not a grinding operation, but is collision treatment of the material to a degree that its bulk, dry, is materially increased. The collision type of treatment herein with the axial discharge from the pulverizer and the operation of the fan for maximum delivery volume notwithstanding there is the regulator 33, results in a material which in its character may be considered as heterogeneous in its elements as to their size or form. This conclusion as to the departure from uniformity, it is believed is confirmed by the fact that collections made of the air float material from the escape valve 49, which should be of a uniform degree of fineness greater than that as passing to the bin 46, does not possess the plasticity attributes to the degree as herein attained in the product as delivered to the bin 46.

In the operations hereunder, the hydrate may be high calcium or dolomitic. If the material be of a degree of plasticity which gets away from the range of so-called mason's hydrate, even into the field of finishing hydrate, the treatment herein has value in improving the plasticity. The improvement in the plasticity is of considerable commercial value in that it responds directly as freshly mixed with water for working into the standard consistency putty. This means that there is not a loss of time, as twenty-four hours, or more, for seasoning the material. In the practice hereunder, there may be a slight improvement of plasticity after this seasoning, but such is negligible as to improvement in the plasticity over the plasticity at the time of mixing.

The physical change in the material as brought about is taken in the instance of a high calcium lime, which as given normal hydration treatment, and even the pulverizer treatment thereafter, wherein the pulverizer had a tangential discharge, in condition for sacking has a weight running close to forty pounds per cubic foot as shaken down thoroughly. The material of this axial discharge collision pulverizer, as herein disclosed, from the same hydrate per cubic foot with the same shaking down approximates thirty to thirty-two pounds per cubic foot. It is the usual experience upon moistening dry hydrate to form a putty, to develop a shrinkage therein. This shrinkage in the material herein runs in excess of thirty per cent, while the similar material of the instance taken is less than twenty-five per cent. However, the putty runs more cubic inches per pound of dry material herein, than of the same substance as in the untreated under this disclosure, the difference being an increase in the bulk herein of over eight per cent.

In the production of the putty hereunder, there is required a less volume of this treated material for the production of a given quantity of putty than of the like substance not treated as herein disclosed. From this it follows, that the voids which may serve for water dispersing for moisture may be reduced notwithstanding the apparent specific gravity of the material has been also decreased. The degree of the sub-division is one wherein the liquid is strongly adsorbed by the solid and the moisture retention is thus built up. This is physically evidenced by a comparison of the substance as treated herein with the similar substance as not given the treatment of this disclosure, but still an impalpable powder hydrate. The standard consistency putty of each may be smeared as to equal quantity upon a piece of blotting paper, and the opposite side of the paper observed to check the time for moisture evidence upon such reverse side of the blotter. With the time interval for the like material herein as not having the handling of this disclosure, two seconds; the materal of this disclosure is effective to retain the moisture five or even up to eight seconds before the suction of the blotter will draw it through to give evidence upon its reverse side. There is, accordingly, a multiple hygroscopic feature evidenced herein, and the treatment may properly be assumed as a physical colloid production treatment in giving the hydrate this state for improved plasticity conditions hereunder. It may be accordingly proper to assume that the impact pulverizer treatment increases the surface area and approaches a more uniform particle sizing, and that such increased area has as to each portion a moisture vapor film as an envelope. The similar material hereunder, as it is normally commercially hydrated, has 97%, while as treated hereunder over 99% of this material passes through a sieve for two hundred mesh per inch.

What is claimed and it is desired to secure by United States Letters Patent is:—

1. The promotion of plasticity of an alkaline earth hydrate which comprises subjecting the hydrate to subdivision by throwing particles thereof and by impinging action abruptly changing the direction of the throw travel of the particles, then drawing such particles radially inward to reduce their velocity, thereafter increasing their velocity, and collecting the particles while keeping said steps in a closed air circuit.

2. The promotion of plasticity of an alkaline earth hydrate which comprises subjecting the hydrate to subdivision by centrifugally throwing particles thereof, there being provided a circumferential impinging path for diverting the thrown particles, drawing such particles radially inward to reduce their velocity, turning back residue portions thereof for further centrifugal throwing action while pneumatically propelling additional portions of said particles, axially withdrawing said latter portions and then further throwing such latter portions, and continuously charging hydrate as undergoing said centrifugal throwing action.

3. The process of producing hydrate of lime which comprises slaking the lime with sodium hyposulphite solution.

4. A hydrate of lime having subdivision thereof by physical shock with the particles of the hydrate therefrom of diverse shapes and sizes which particles approach air float condition, and increased dry bulk thereof over the same material not so subdivided.

5. The method of increasing the plasticity of an alkaline earth hydrate and decreasing the apparent specific gravity over similar consistency putty from the same material not so subdivided, said method comprising throwing the dry material to effect subdividing thereof.

6. A hydrated lime having subdivision thereof by physical shock with the particles of the hydrate therefrom of diverse shapes and sizes which particles approach air float condition and decreased apparent specific gravity as made into putty over similar consistency putty made from the same material not so subdivided.

7. The method of increasing the plasticity of an alkaline earth hydrate decreasing the apparent specific gravity of the dry hydrate and simultaneously decreasing the quantity of moisture for the production of the putty therefrom over similar consistency putty from the same material not so subdivided, said method comprising throwing particles of hydrate against an obstruction to effect shattering thereof.

8. The method of producing a dry hydrate of lime directly plastic as freshly mixed to putty consistency, said method comprising the step of throwing against an obstruction the dry hydrate at shattering-effecting velocity.

9. As a new article of manufacture a shattered hydrate of lime of finish plasticity as freshly made into putty.

10. As a new article of manufacture a finish hydrate of lime directly plastic as freshly mixed with water, the particles of said hydrate being of diverse shapes and sizes, and having 99% of said particles pass through a sieve two hundred mesh per inch.

In witness whereof I affix my signature.

HIPPOLYT DITTLINGER.